US006189038B1

(12) United States Patent
Thompson et al.

(10) Patent No.: US 6,189,038 B1
(45) Date of Patent: *Feb. 13, 2001

(54) GENERIC NOTIFICATIONS FRAMEWORK SYSTEM AND METHOD FOR ENHANCING OPERATION OF A MANAGEMENT STATION ON A NETWORK

(75) Inventors: Dean R. Thompson, Fort Collins; Thomas G. Bartz, Loveland, both of CO (US)

(73) Assignee: Hewlett-Packard Company, Palo Alto, CA (US)

( * ) Notice: Under 35 U.S.C. 154(b), the term of this patent shall be extended for 0 days.

This patent is subject to a terminal disclaimer.

(21) Appl. No.: 09/442,787

(22) Filed: Nov. 18, 1999

Related U.S. Application Data

(63) Continuation of application No. 08/972,830, filed on Nov. 18, 1997, now Pat. No. 6,012,095, which is a continuation of application No. 08/656,683, filed on May 31, 1996, now abandoned.

(51) Int. Cl.[7] .................................................. G06F 3/00
(52) U.S. Cl. ............................... 709/231; 709/233; 714/4
(58) Field of Search ............................ 709/231, 233; 714/4; 379/466

(56) References Cited

U.S. PATENT DOCUMENTS

| 4,979,169 | * | 12/1990 | Almond et al. ...................... 370/466 |
| 5,491,690 | * | 2/1996 | Alfonsi et al. ....................... 370/404 |
| 5,896,440 | * | 4/1999 | Reed et al. .............................. 379/1 |

* cited by examiner

*Primary Examiner*—Meng-Ai T. An
*Assistant Examiner*—Gautam R. Patel (57) ABSTRACT

A generic notifications framework (GNF) system integrates information from different protocols in a management station interfaced with a network and permits correlation of the information to make more sophisticated management decisions. The generic notifications framework system has one or more protocol-specific translators in communication with the network, a generic notifications framework in communication with the translators, and one or more consumer components in communication with the framework. The translators receive event data elements corresponding with different management protocols from the network and translate the event data elements into respective canonical data structures. Each of the canonical data structures includes (a) a generic field that is common to all of the canonical data structures, (b) one or more attribute fields generated by the translator based upon an examination of a protocol data unit (PDU) associated with each of the event data elements, and (c) a protocol data unit (PDU) that is generally identical to the native PDU that arrived with the event data element. Consumer components register with the framework to receive any canonical data structures having particular attribute fields. The generic notifications framework forwards the appropriate canonical data structures to appropriate consumer components based upon the attribute field values. A correlator may be associated with the framework to correlate the canonical data structures to derive an intelligent event data element, which is essentially the result of an assimilation and logical evaluation of various event data elements. Hence, event data elements are treated and processed generically, and this feature permits more sophisticated decisions to be made.

31 Claims, 6 Drawing Sheets

GENERIC NOTIFICATIONS FRAMEWORK SYSTEM AND METHOD FOR ENHANCING OPERATION OF A MANAGEMENT STATION ON A NETWORK

RELATED APPLICATIONS

This application is a continuation application of Ser. No. 08/972,830, filed Nov. 18, 1997, now U.S. Pat. No. 6,012,095, which in turn is a continuation application of Ser. No. 08/656,683, filed May 31, 1996, now abandoned.

FIELD OF THE INVENTION

The present invention generally relates to data communication networks, and more particularly, to a generic notifications framework (GNF) system and method for integrating information from different protocols in a management station interfaced with a network and for permitting correlation of the information to make more sophisticated management decisions regarding the network or station. In addition to network management, these management decisions can also be directed to higher level system management in the case of distributed systems or distributed management applications operating above the network.

BACKGROUND OF THE INVENTION

A data communications network generally includes a group of devices, for instance, computers, repeaters, bridges, routers, etc., situated at network nodes and a collection of communication channels for interconnecting the various nodes. Hardware and software associated with the network and particularly the devices permit the devices to exchange data electronically via the communication channels.

In order to keep track of and manage the various devices situated on a network, various management protocols have been developed. Examples of these management protocols include the simple network management protocol (SNMP), the common management information protocol (CMIP) standardized by the International Organization for Standardization (ISO), proprietary protocols that can be found in proprietary network environments, such as SNA™ from IBM Corp. and NETWARE™ (NW) from Novell Corp., and remote procedure call protocols (RPC), such as the distributed computing environment protocol (DCE-RPC) that was developed by the Open Software Foundation. The use of the foregoing protocols has become extensive in the industry, and numerous vendors now manufacture many types of network devices which can employ these protocols.

Many management software packages ("management platforms") are presently available for implementing "management stations" on a network. Examples of commercially available management software packages include "OPENVIEW"™ (or "HP OPENVIEW"™) from the Hewlett-Packard Company, which is the assignee herein, "NETVIEW"™ from IBM Corp., "SPECTRUM"™ from Cabletron Systems, Inc., "NETLABS MANAGER"™ from NetLabs, Inc., and "SUNNET MANAGER"™ from Sunconnect Inc. The nodes on the network and their interconnections, oftentimes referred to as the network "topology," are best displayed in a graphical format, and most, if not all, of the available management software packages provide for this feature.

Typically, with these packages, a network can be viewed from different vantage points, depending on the scope of the view that is desired. For example, one view of the network could be a very wide encompassing view of all nodes on the entire network. A second view could be a view of those portions of a network within a local range, for example, within a particular site or building. A third view of a network, often called a segment, could be a view of nodes attached to a particular local area network (LAN) cable.

Hewlett-Packard's very successful "OPENVIEW"™ has been the subject of several patents, including for instance, U.S. Pat. No. 5,185,860 issued to J. C. Wu on Feb. 9, 1993, and U.S. Pat. No. 5,276,789 issued to Besaw et al., on Jan. 4, 1994. U.S. Pat. No. 5,185,860 describes an automatic discovery system for a management system for determining the network devices and interconnections of a network, or the topology. U.S. Pat. No. 5,276,789 describes a graphic display system for a management station for graphically displaying the topology of a network and provides for various views (including, internet, segment, and node views) that can be requested by a user.

Although the presently available management stations are meritorious to an extent, the art of management stations is still in a state of infancy, and the performance of current management stations can still be enhanced and optimized. A specific area where optimization is envisioned involves the sharing of information derived from events among applications that are associated with the management stations. Herein, an "event" is a notification emitted by any element in the managed environment to indicate a change in state. Events are typically asynchronous relative to the management station. Moreover, there already exist numerous event forwarding and distribution mechanisms, but each is highly tuned to a particular environment or protocol domain. This predicament causes several problems.

First, many applications require access to notifications for more than one of the protocol domains making up the managed environment. However, their implementation is currently complicated due to the number and variety of protocols and interfaces required. Application access to event data should not be burdened by a required understanding of the detailed syntax and semantics of environment-specific protocols, representations of, and interfaces to, the event data.

Second, there is no single, common mechanism for gathering notifications from multiple domains. In the context of this document, a "notification" is any message that is emitted asynchronously with respect to a receiver and in a logically non-directed fashion. In some cases, specific modules have been created to map notifications from one mechanism to another, but this results in an "n by m" problem and often distorts the information because of the target's environment-specific, often nonapplicable elements. In some cases, information from an original notification is lost altogether, because there is no semantically comparable structure in the target.

Third, applications do not have a common integration mechanism for exchanging asynchronous messages among the applications.

Fourth, there is little in the way of shared semantics between applications to allow the creation of generic functions. Specifically, there is no current way to implement a common event management console, a common filtering mechanism, or common tools that can be applied to all variants of event data.

Thus, a heretofore unaddressed need exists in the industry for a system and method for enhancing operation of a management station on a network by integrating and correlating information from different protocols.

SUMMARY OF THE INVENTION

Briefly described, the present invention is a generic notifications framework (GNF) system and method for integrating information from different protocols in a management station interfaced with a network and for permitting correlation of the information to make more sophisticated management decisions.

Structurally, the generic notifications framework system has one or more protocol-specific translators in communication with the network, a generic notifications framework in communication with the translators, and one or more consumer components in communication with the framework. The translators receive event data elements corresponding with different management protocols from the network and translate the event data elements into respective canonical data structures. Each of the canonical data structures includes (a) a set of generic fields that are common to all of the canonical data structures, (b) one or more attribute fields generated by the translator based upon an examination of a protocol data unit (PDU) associated with each of the event data elements, and (c) a protocol data unit (PDU) that is generally identical to the native PDU that arrived with the event data element. In essence, the PDU in the canonical data structure is an encapsulation of any native data so applications that understand the representation have full access to its contents.

Consumer components register with the framework to receive any canonical data structures having particular values for attribute fields. Moreover, the generic notifications framework forwards the appropriate canonical data structures to appropriate consumer components based upon the values of the attribute fields.

A correlator, optionally but preferably, may be associated with the framework to correlate the canonical data structures to derive an intelligent event data element, which is essentially the result of an assimilation and logical evaluation of various event data elements. Hence, event data elements are treated and processed generically, and this feature permits more sophisticated decisions to be made.

The present invention provides a generic notifications framework method for enhancing operation of a management station on a network by integrating information from different management protocols, as follows: receiving event data elements corresponding with different management protocols from the network; translating the event data elements into respective canonical data structures, each of the canonical data structures including at least one attribute field generated by examining a protocol data unit associated with each of the event data elements; passing the canonical data structures to a framework for possible distribution to consumer components that are connected to the framework; communicating a particular attribute field from a consumer component to the framework to indicate that the consumer component wishes to receive any of the canonical data structures with the particular attribute field; and forwarding a canonical data structure with the particular attribute field from the framework to the consumer component.

Furthermore, the present invention provides a method for enhancing operation of a management station on a network by both integrating and correlating information from different management protocols, as follows: receiving event data elements from the network; translating each of the event data elements into a canonical data structure, the canonical data structure capable of being correlated with other canonical data structures corresponding to other event data elements regardless of protocols associated with the event data elements; and correlating the canonical data structures to derive an intelligent event, which is essentially an action resulting from a high level intelligent decision derived from assimilation and evaluation of various events.

The present invention has numerous advantages, a few of which are delineated hereafter, as examples.

An advantage is that a protocol-neutral representation of each event can be accomplished, which greatly simplifies the creation of common management mechanisms, filters, displays, and tools.

Another advantage is that asynchronous messages can be exchanged between applications that operate in accordance with different protocols.

Another advantage is that the interface between applications is simplified.

Another advantage is that applications do not need to understand the detailed syntax and semantics of environment-specific protocols, representations of, and interfaces to, the event data in order to communicate between each other.

Another advantage is that information from different protocols can be integrated and correlated so that more sophisticated decisions can be made concerning management.

Another advantage is that more sophisticated decisions can be made for networked computing environments having multiple heterogeneous networks and network management protocols.

Other features and advantages of the present invention will become apparent to one with skill in the art upon examination of the following drawings and detailed description. It is intended that all such additional features and advantages be included herein within the scope of the present invention, as is defined in the accompanying claims.

BRIEF DESCRIPTION OF THE DRAWINGS

The present invention can be better understood with reference to the following drawings. Note that like reference numerals within the drawings designate corresponding parts.

DETAILED DESCRIPTION OF THE PREFERRED EMBODIMENTS

The generic notifications framework (GNF) system of the present invention can be stored on any computer-readable medium for use by or in connection with a computer-related system or method. In the context of this document, a computer-readable medium is an electronic, magnetic, optical, or other physical device or means that can contain or store a computer program for use by or in connection with a computer-related system or method.

The GNF system and method can be implemented in virtually any environment that processes asynchronous events that concern the resources being managed in a network, a distributed network, or other communication system. In the preferred embodiment, the GNF system and method are implemented in a management station. A management station is any machine that runs at least a portion of the management system. An example of a management station is discussed hereafter for purposes of discussion.

Figure 1:
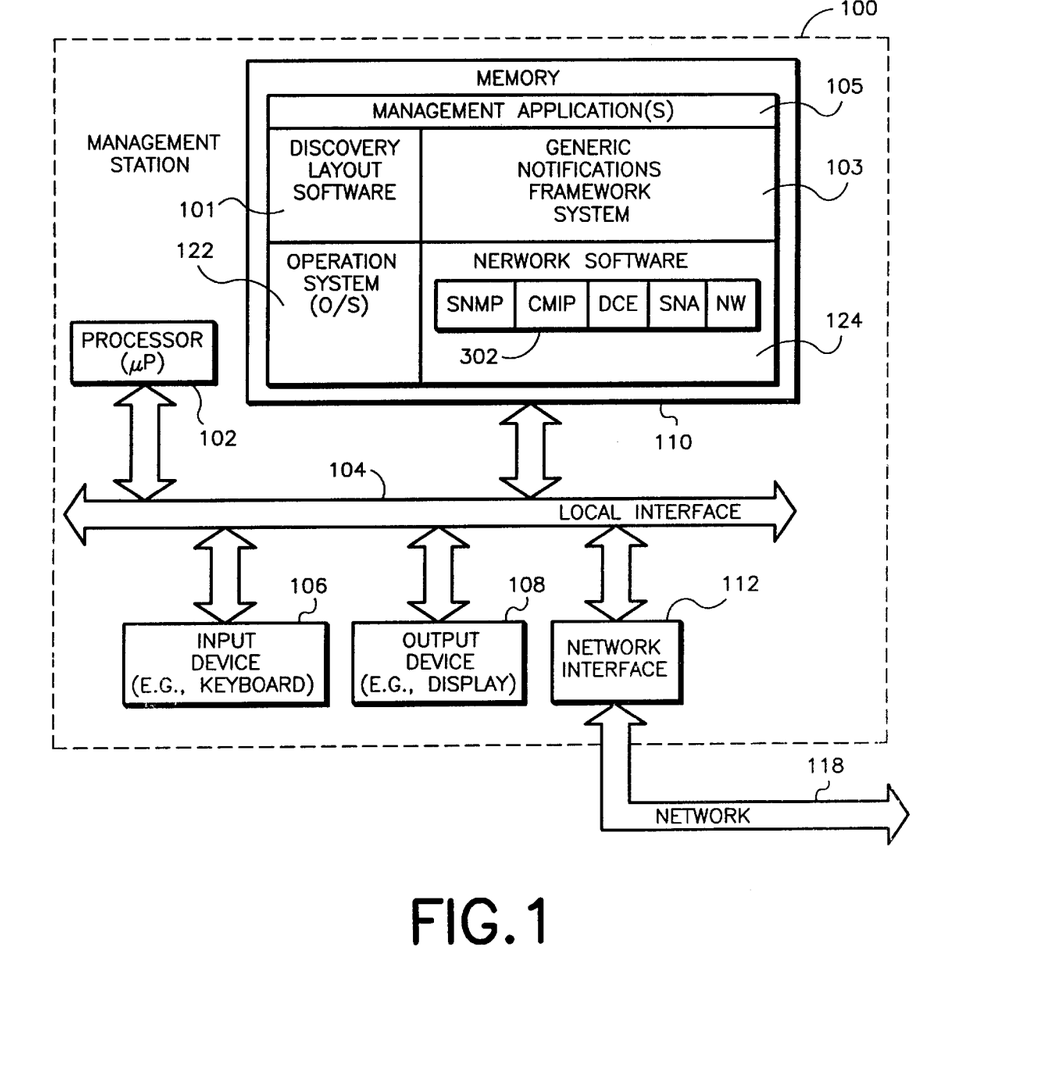
FIG. 1 is a block diagram illustrating an example of implementation of the generic notifications framework (GNF) system of the present invention in a management station, which is the best mode known at present for practicing the invention.

FIG. 1 shows a block diagram of a management station 100 which is implemented with a general purpose computer system containing discovery/layout software 101, which utilizes the GNF system 103 and associated methodology of the present invention. With reference to FIG. 1, the management station 100 contains any suitable processor 102. The processor 102 communicates to other elements within the management station 100 over a local interface 104, for instance, a bus or buses. An input device 106, for example, a keyboard or mouse, is used to input data from a user of the management station 100, and an output device 108, for example, a display or printer, is used to output data to the user. A network interface 112 is used to interface the management station 100 to a network 118 or group of networks in order to allow the management station 100 to act as a node on the network 118 or group of networks. A memory 110 within the management station 100 stores the software for driving the processor 102 and generally the station 100.

As shown, in this embodiment, the memory 110 can include the following hierarchy of software: at the highest logical level, one or more management applications 105; at the next logical level, discovery/layout software 101 situated in a logical sense alongside of the GNF system 103; and at the lowest logical level, a conventional operating system 122 and conventional network software 124. The one or more management applications 105 manage, at a high level, an aspect of the network 118 or group of networks. Both the discovery/layout software 101 and the GNF system 103 can communicate with the operating system 122 and network software 124 to discover the nodes on the network 118. The network software 124 serves as the intelligence, including validation, for the data communication protocols. As shown in FIG. 1, the network software has subsystems 302 that can implement, as examples, the following protocols: SNMP, CMIP, DCE, and proprietary protocols of the SNA and NW. All of the foregoing protocols are well known in the art. Generally, the discovery/layout software 101 of FIG. 1 is configured to discover the network topology, that is, all network nodes and node interconnections existing on the network 118, and to construct a map, comprising various submaps, any of which can be used for outputting the network topology on the output device 108.

Figure 2:
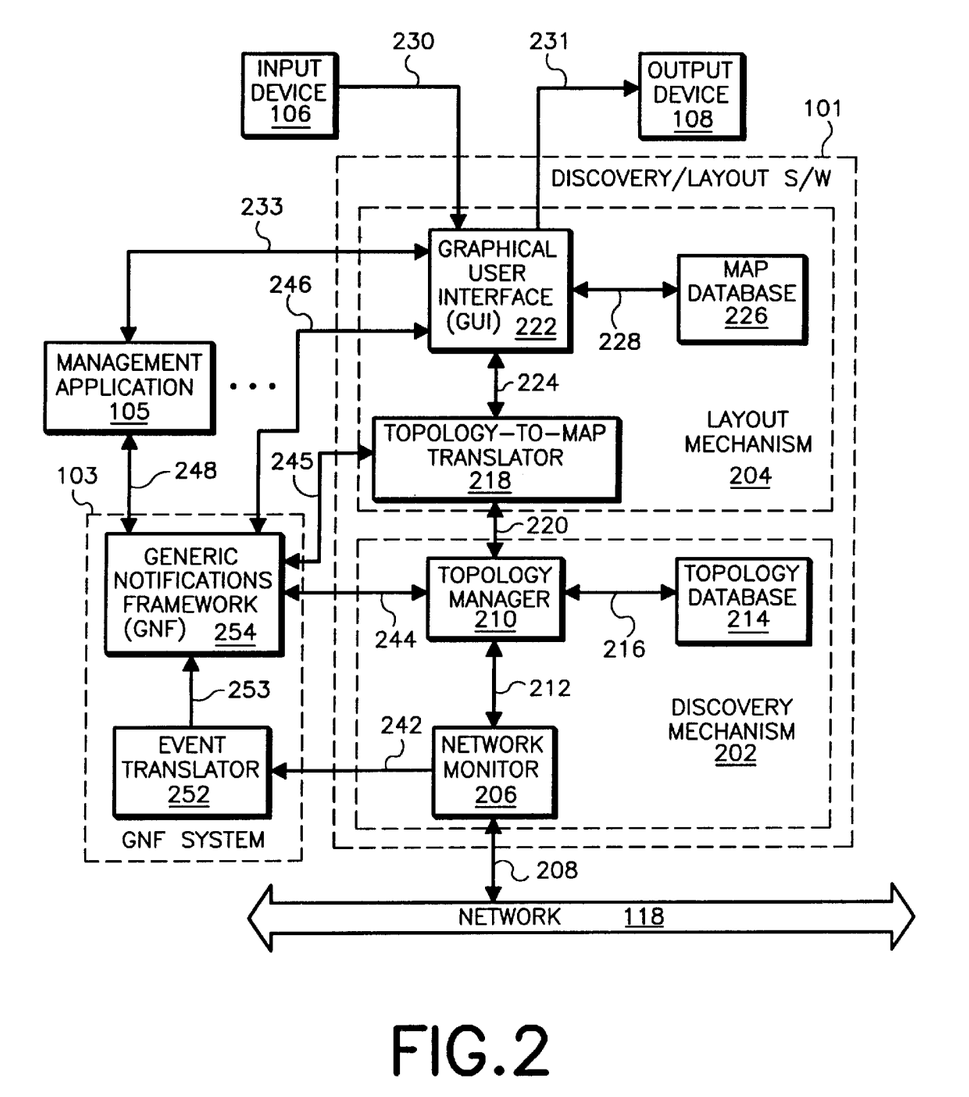
FIG. 2 is a block diagram illustrating the discovery/layout software and the GNF system of FIG. 1.

A high level block diagram of the GNF system 103 and the discovery/layout software 101 (FIG. 1) is set forth in FIG. 2. With the exception of the GNF system 103, the architecture of the discovery/layout software 101 in FIG. 2 is essentially the same as or similar to the architecture of Hewlett-Packard's well known and commercially available management software package called "OPENVIEW"™. As shown in FIG. 2, at a general architecture level, the discovery/layout software 101 comprises a discovery mechanism 202 for discovering nodes and interconnections of the network 118 and a layout mechanism 204 for receiving topology data from the discovery mechanism 202 and for generating the map for driving the output device 108. Moreover, one or more management applications 105 may communicate display and map information with the layout mechanism 204.

The discovery mechanism 202 has a network monitor 206 connected to the network 118 as indicated by connection 208, a topology manager 210 connected to the network monitor 206 as indicated by arrows 212 and through the generic notifications framework (GNF) system 103 that will be described in detail at a later point in this document, and a topology data base 214 in communication with the topology manager 210 as indicated by arrow 216.

The network monitor 206 transmits and receives data packets to and from the network 118. The network monitor 206 discovers and monitors network topology, as indicated by arrow 208. When network topology changes on the network, the network monitor 206 generates events, or traps (SNMP vernacular), which include an object identifier and object change information. The network monitor 206 can also receive events from other devices, such as a router, in the network 118. The network monitor 206 interacts with the network 118 by way of the network software 124 (FIG. 1), which essentially comprises protocol stacks, corresponding to, for example, IP, TCP, UDP, SNMP, ISO, DCE, SNA, and NW, and which generally implements these protocols and performs validation functions. Furthermore, the network monitor 206 populates the topology data base 214 by way of the topology manager 210 and notifies the topology manager 210 of events (topology changes). Finally, it should be noted that U.S. Pat. No. 5,185,860 to Wu, which is incorporated herein by reference, describes an example of a node discovery system which could be employed to implement the network monitor 206 herein. The foregoing monitor focuses upon monitoring events pertaining to changes in topology. Other monitors could be employed in connection with the present invention and directed to monitoring other aspects of the environment, in which case other types of management information might be passed through the monitor and the GNF system 103.

The topology manager 210 manages the topology data base 214, as indicated by bidirectional arrow 216. The topology manager 210 prompts the network monitor 206 to update topology data related to particular events and receives topology updates, as indicated by arrow 212.

The topology data base 214 stores topology data based upon objects, which are used to partition the network for logical reasons. Objects include, for example but not limited to, a network, a segment, a computer, a router, a repeater, a bridge, etc.

Moreover, the topology data stored with respect to the objects includes, for example but not limited to, an interface or device address, an interface or device type, an interface or device manufacturer, and whether an interface or device supports the SNMP.

The layout mechanism 204 has a topology-to-map translator 218 in communication with the topology manager 210 as indicated by arrow 220, a graphical user interface (GUI) 222 in communication with the topology-to-map translator 218 as indicated by arrow 224, and a map data base 226 in communication with the GUI 222 as indicated by bidirectional arrow 228. The one or more applications 105 communicate information with the GUI 222, as indicated by arrow 233.

The translator 218 converts topology data received from the topology data base 214 and the GNF system 103 into map data and constructs various submaps in the map. The translator 218 can forward a request to the topology manager 210, as indicated by arrow 220, in order to obtain topology data regarding particular objects. In addition to forwarding topology data to the translator 218 upon request, the topology manager 210 advises the translator 218, as indicated by respective arrows 220, when topology data has changed based upon an event so that the translator 218 can make any appropriate changes in the submaps.

Furthermore, the translator 218 can register with the GNF system 103 to receive a certain type of topology data or event. In turn, when appropriate, the topology manager 210 and the GNF system 103 forward the topology data to the translator 218, as indicated by respective arrows 220, 245. The GNF registration feature eliminates the need for the translator 218 to keep making requests for desired data.

The GUI 222 manages the map data base 226, as indicated by the arrow 228, and manages the input device 106 and output device 108, as indicated by the respective arrows 230, 231. The GUI 222 receives map updates from the translator 218 and submits user-triggered events to the translator 218, as indicated by arrow 224. A user-triggered event includes a prompt 230 from a user to explode an object. Finally, it should be noted that U.S. Pat. No. 5,276,789 to Besaw et al., which is incorporated herein by reference, describes a graphical user interface which could be employed to implement the GUI 222 herein.

The GNF system 103 of the present invention is in communication with the network monitor 206, the topology manager 210, the GUI 222, and the one or more applications 105, as indicated by respective arrows 242, 244, 246, and 248 in FIG. 2. In general, the GNF system 103 enables the sharing of events from different management protocols, such as SNMP, ISO, DCE, SNA, and NW, and permits correlation of the information to make more sophisticated management decisions.

An example of an application 105 that may obtain information from the GNF system 103 is a map builder application. This application might listen for topology data changes (write notification), which affect the layout of any of its generated maps. Moreover, this example extends to any application 105 dealing with the dynamic presentation of data or information to the user.

The GNF system 103 comprises an event translator 254 and a GNF 254, which are in communication as indicated by reference arrow 253. The translator 254 is configured to translate event data into a canonical data structure (FIG. 4), which is capable of being correlated with other canonical data structures corresponding to other event data, regardless of protocols associated with the event data. Further, the canonical data structure enables the GNF system 254 to perform common semantic operations, such as filtering, forwarding, tracing, and logging. The canonical data structures are forwarded by the translator 254 to the GNF 254, which can filter the canonical data structures and forward the structures to any consumers, such as the topology manager 210, the GUI 222, or an application 105.

Figure 3:
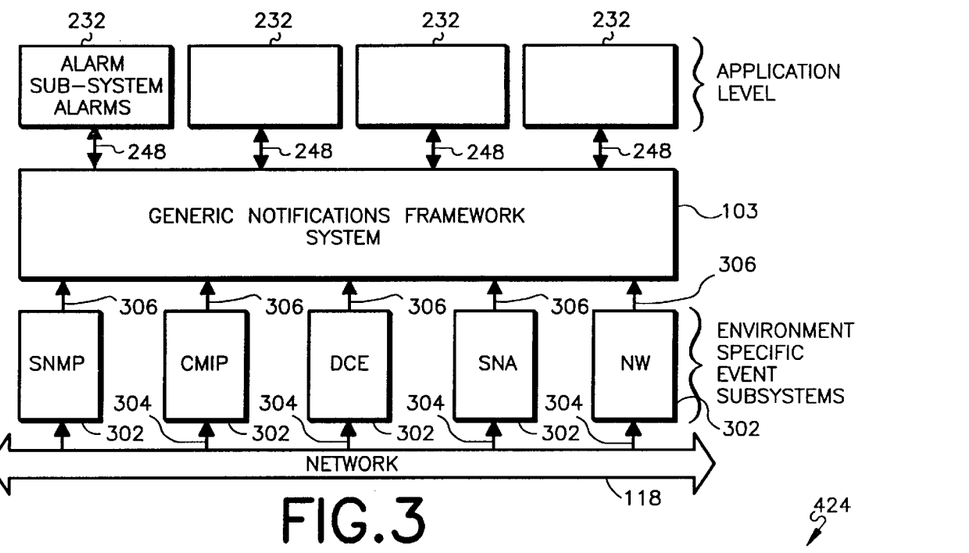
FIG. 3 is a block diagram illustrating the GNF of FIG. 1 interfacing various environment-specific event subsystems that operate upon events having different protocols.

FIG. 3 is a block diagram illustrating the communication links that can be established by the GNF system 103 in the station 100 (FIG. 1). The GNF system 103 interfaces one or more environment-specific event subsystems 302 conforming to various different protocols and, further, interfaces the various subsystems 302 with the one or more applications 105. The GNF system 103 serves as an integration point where event information pertaining to events concerning the network 118 is shared. The environment-specific event subsystems 302 can be directed to any suitable protocol, for instance, SNMP, CMIP, and DCE-RPC, or those protocols provided by SNA and NW.

In the preferred embodiment, the subsystems 302 are situated within or associated with the network monitor 206 (FIG. 2). Moreover, one of the management applications 302 can be, for example, an alarm subsystem, as is shown in FIG. 3.

Figure 4:
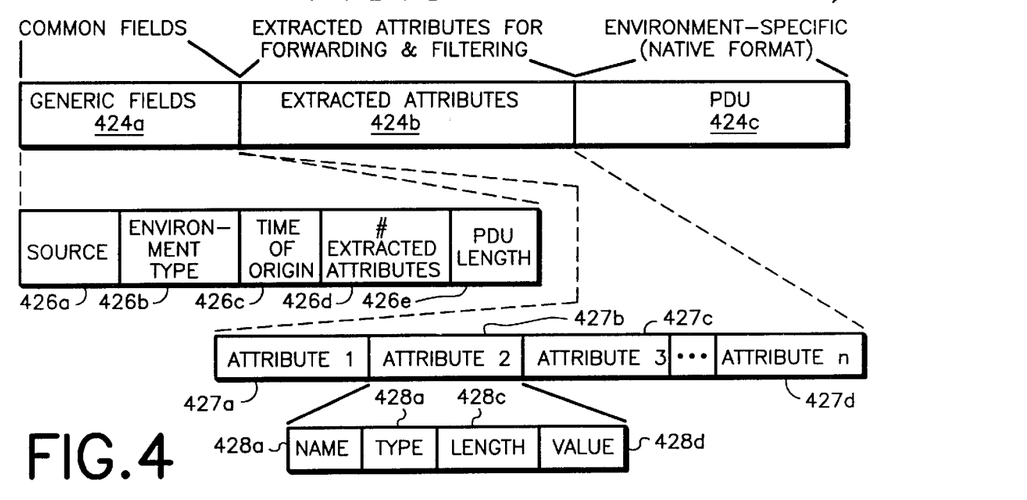
FIG. 4 is a schematic diagram illustrating the canonical data structure for event data that is communicated through the GNF system of FIG. 1.

The canonical data structure is shown in FIG. 4 and generally denoted by reference numeral 424. The canonical data structure 424 includes generic fields 424a, extracted attributes 424b, and a native protocol data unit (PDU) 424c. In a sense, when transmitted, the canonical data structure 424 itself is a form of PDU. The generic fields 424a are those few attributes which can be considered common (or nearly common) to all environment-specific formats. The extracted attributes are a collection of fully-specified attributes, including name, type, length, and value, which have been extracted from the native formats so they can be interpreted by any receiver. The environment-specific PDU 24c is an encapsulation of any native data so applications that understand the representation have full access to its contents. For some advisory types, a native format may not exist or apply, in which case the environment-specific PDU 424c and, perhaps, the extracted attributes 424b would be empty. An "advisory" is a notification emitted by an element of the management station 100 (FIG. 1) for the purpose of keeping its normal workings properly synchronized. As an example, the structure of this canonical data structure 424 can be specified by an object management group (OMG) interface definition language (IDL) (i.e., an OMG IDL defined data structure), which is a commercially available programming language for describing object interfaces and data structures. The generic fields 424a are those that are present in all canonical data structure notifications, have a widely understood semantic, and have useful values in the vast majority of notification instances. The number, position, and type of these fields is fixed, and therefore, they may be used by any element in the environment for filtering functions. There are relatively few of these generic fields 424a. In a preferred embodiment, the generic fields include: a source designation 426a, which is a string (printable) containing a name for the entity which originally generated the notification; an environment type 426b, which designates the kind of notification or the environment in which it originated (examples include generic, SNMP, DCE, SNA, NW, CMIP, etc.; these must be unique values and thus must be handled via a registration service or be inherently unique); an origination time 426c, which is the time at which the notification was augmented in its native form or injected into the GNF system 103; an extracted attributes number 426d, which is the number of extracted attributes that follow; and a PDU length 426e, which indicates the length of the native PDU 424c as attached to this notification (preferably, a length of zero indicates no native PDU present).

The number of extracted attributes 424b is variable in the canonical data structure 424. The extracted attributes 424b comprise a sequence of 4-tuple attributes 427a–427d containing a name 428a, a type 428b, a length 428c, and a value 428d. Because all elements in this sequence are explicit, operations, such as comparisons for filtering, may be performed on them with confidence and without a need to extend the infrastructure for the introduction of new field names. The types available include those defined by the OMG IDL. The attributes 427a–427d may actually be extracted from an environment-specific PDU 424c when it is mapped to the canonical data structure 424 (hence the name) or simply a variable portion of the notification (in the case of advisories).

The PDU 424c is essentially a string of bits that is uninterpreted by the GNF system 103, but is maintained by the GNF system 103. The PDU 424c usually comprises the original, domain specific, event PDU, but may be used to pass any other information that will not be interpreted by the GNF system 103, but will be forwarded by it.

Figure 5:
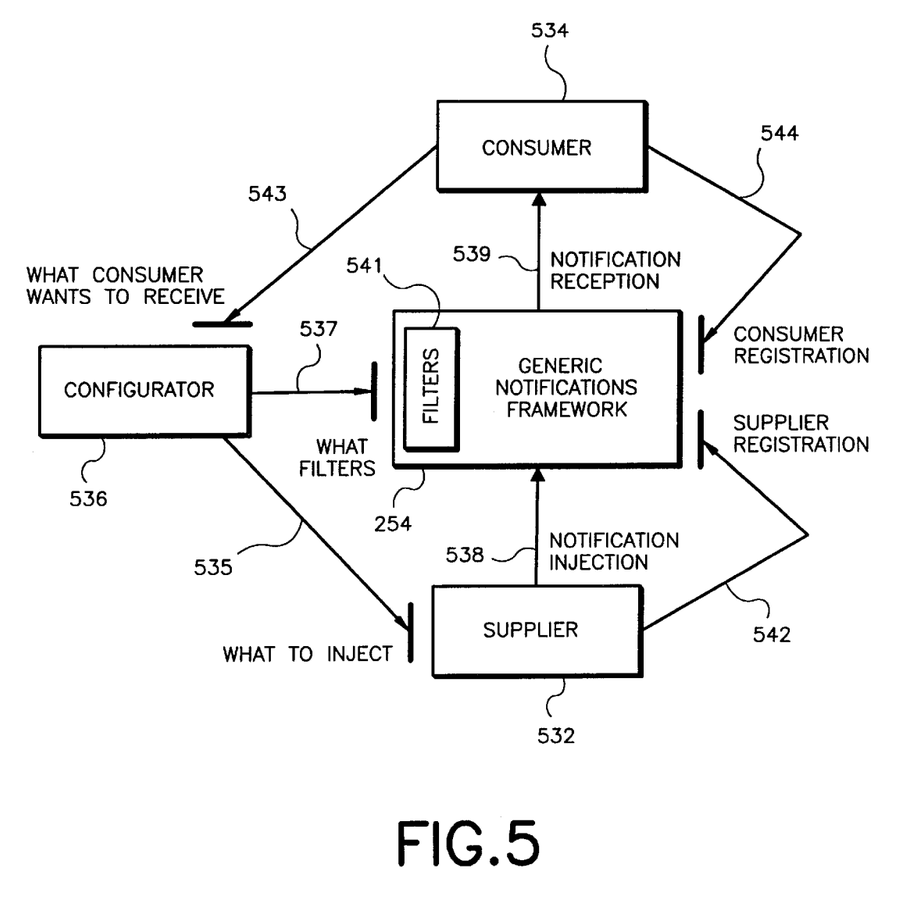
FIG. 5 is a block diagram illustrating the roles (i.e., supplier, consumer, and configurator) that are assumed by components that interact with the GNF system of FIG. 1.

The roles that can be played by components which interact with the GNF 254 of the GNF system 103 will now be described with reference to FIG. 5. Essentially, there are three roles that can be played by components which interact with the GNF system 103: supplier 532 (e.g., the network monitor 206), consumer 534 (e.g., the topology manager 210, the GUI 222, an application 105), and configurator 536 (e.g., the network monitor 206, the topology manager 210, the GUI 222, an application 105). The supplier 532 injects management signals into the GNF 254 of the GNF system 103, as indicated by reference arrow 538, whereas the consumer 534 receives management signals from the GNF 254, as indicated by the reference arrow 539. The GNF 254 receives management signals from the supplier based upon registration of the supplier with the GNF 254, as denoted by reference arrow 542, and the GNF 254 transfers management signals to the consumer, based upon registration of the consumer 534 with the GNF 254, as denoted by reference arrow 544. In essence, the consumer 534 can inform the configurator 536 what it is interested in, and the configurator 536 can establish a filter for same.

The configurator 536 configures the supplier 532 and the consumer 534, as indicated by respective reference arrows 535, 537 and receives configuration information from the GNF 254, as indicated by reference arrow 543. Note that in the figures, configuration accesses are indicated by narrow elongated bars. The aforementioned exchange of configuration information ensures consistency among management signals injected, forwarded, and received via the GNF 254. It should be noted that the foregoing roles are entirely logical in nature. A given application or service may in fact play any one, two, or all three of these roles.

At initialization (or possibly later), the configurator 536 adds one or more filters 541 that the GNF 254 is to use in distributing specific management signals. The configurator 536 can then set up suppliers 532 to inject management signals of interest into the GNF 254. If translation from a native format into the canonical data structure 424 (FIG. 4) is being performed by the supplier 532, then the configurator 536 may specify additional variations, such as which native attributes are to be extracted. At this point, the supplier 532 understands its mission and can register itself with the GNF 254 so that the GNF 254 can begin generating management signals 39.

The consumer 534 may likewise require configuration by the configurator 536, if the consumer 534 retains the flexibility to dynamically process various management signals 539. In this scenario, the configurator 536 responds to a filter request from the consumer 534 by forwarding the response to the GNF 254, and the response is ultimately communicated to the consumer 534 via the GNF 254. Once the configuration has been established, the consumer 534 knows which signals to register for and can establish its connectivity with the GNF 254, as delineated by reference arrow 544. The consumer registration simply associates the consumer with the results of a filter.

Hence, the meeting point (pipe or event channel) may be either established by the consumer 534 and communicated to the configurator 536 or established by the configurator 536 in response to a filter request from the consumer 534 and communicated back to the consumer 534. In either case, this meeting point is where the GNF 254 places events that pass the associated filter.

After the required configuration has taken place, the supplier 532 can generate management signals 538, which are distributed by the GNF system 103 for consumption by the consumer 534, as indicated by the reference arrow 539.

In terms of implementation, it is important to remember that these roles (i.e., supplier, consumer, and configurator) are logical in nature. Consequently, the role of configurator 536 may in practice be separated among several components or its presence may not even be apparent, if it is imbedded within the supplier 532 or the consumer 534. Furthermore, a number of the aforementioned configuration steps are optional in that they may not be required by all the implementations or uses of the GNF system 103, especially if a particular supplier 532 and consumer 534 are static in terms of the management signal they handle.

Figure 6:
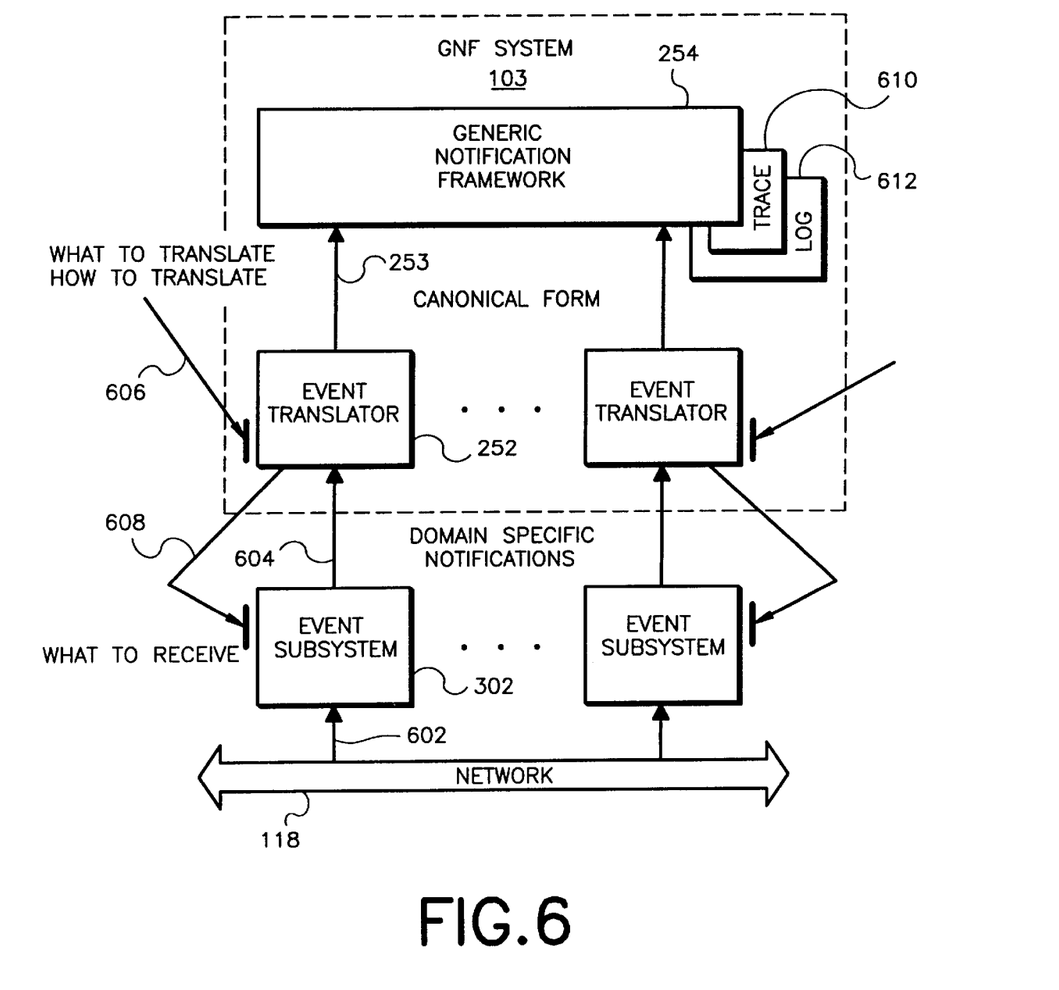
FIG. 6 is a block diagram illustrating an example of a supplier in the form of an event subsystem of FIG. 3.

With reference to FIG. 6, suppliers 532 may be implemented as event subsystems 302, which can be dedicated to process events pertaining to the protocols SNMP, CMIP, DCE, proprietary protocols of SNA, NW, etc. The event subsystems 302 are interconnected with the network 118 and receive events 602 from the network 118. Events are sent to a specific address and port that correspond to each event subsystem 302. Each event subsystem 302 forwards events 604 to its corresponding event translator 252. Moreover, the event translator 252 converts the event data, i.e., the PDU, into the canonical data structure 424 (FIG. 4) and transfers the canonical data structure 424 to the GNF 254, as indicated by reference arrow 253 in FIG. 6.

The event translators 252 are configured by the configurator 536 (FIG. 5), as indicated by arrow 606 in FIG. 6, with respect to which environment-specific PDU attributes need to be pulled out as extracted attributes 427a–427d (FIG. 4) in the canonical data structure 424 (FIG. 4). Additionally, when the event translators 252 are configured, it is their responsibility to configure their associated event subsystem 302 to filter and forward its appropriate events to the event translator 252 so that the event translator 252 can relay the events to the GNF 254.

Optionally, the GNF 254 may be equipped with a trace mechanism 610 and an event log mechanism 612. The trace mechanism 610, unlike the event log mechanism 612, applies to all management signals introduced into the GNF 254. The trace mechanism 610, like the event log mechanism 612, follows the consumer model in providing a consumer to receive all management signals and to capture a brief written record of its occurrence. The trace mechanism 610 can serve as a debugging and support aid and can be designed for managing management processes themselves.

The event log mechanism 612 is used to capture a record of all event type management signals that have been introduced into the GNF 254. Particularly, the event log mechanism 612 preserves the data of the canonical data structure 424 (FIG. 4) for event management signals, described earlier, so that interested applications can access the generic fields 24a, the extracted attributes 24b, and the PDU 24c.

Moreover, the event log mechanism 612 provides a basis for event correlation and alarm mapping, described hereinafter, plus it provides a historical record of the events that have occurred across all the managed environments. The event log mechanism 612 should, of course, be configurable to log only the events of interest; not all events forwarded into the GNF 254 need necessarily be placed in data storage. As such, it is important to note that the event log mechanism 612 has its own consumer that receives and writes the events into the data base. The only difference between this consumer and consumers 534 is that the log consumer is built directly into the GNF 254 for increased performance.

Both the trace mechanism 610 and the event log mechanism 612 should be provided with configurable interfaces to specify storage policy so available memory does not overflow and entries are deleted accordingly to a deliberately chosen method.

Figure 7:
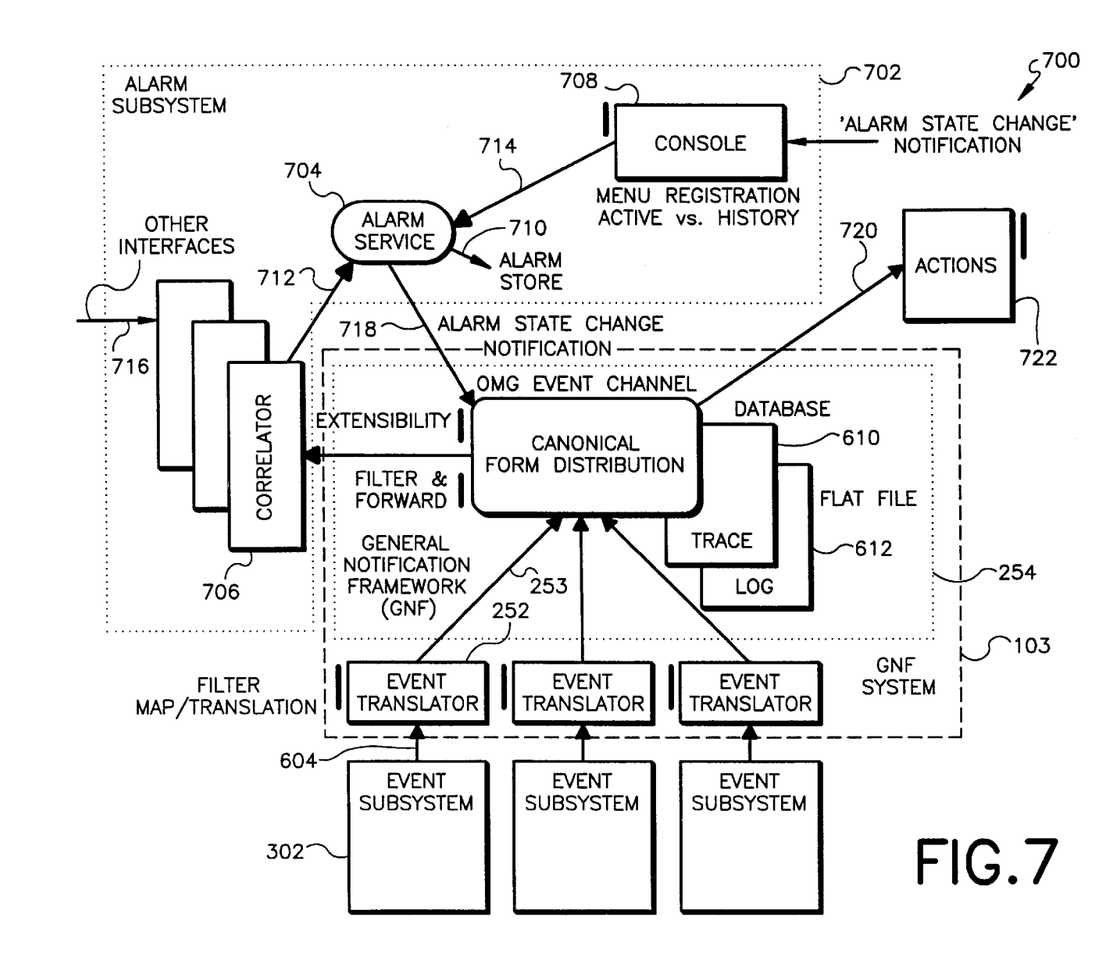
FIG. 7 is a block diagram illustrating an alarm subsystem having correlation functions that is employed in connection with the GNF of FIG. 1.

The GNF system 103 can be implemented in connection with an alarm subsystem 702, as is illustrated in FIG. 7. In essence, the alarm subsystem 702 uses the GNF system 103 in its management of alarms. In the context of this document, an "alarm" is a recorded interpretation, with state, of one or more events. The alarm subsystem 702 comprises the components used for defining, updating, storing, presenting, and giving access to alarms. In architecture, the alarm subsystem 702 comprises an alarm service 704, one or more correlators 706 (or correlators), and an alarm console 708. The alarm service 704 provides alarm storage services 710, based upon data received from the correlators 706 and the console 708, as is indicated by respective reference arrows 712, 714. The correlators 706 determine when alarms are created. Finally, the console 708 comprises user interface tools for viewing and manipulating alarms.

The input 716 to the correlators 706 can be provided by any management application 105 (FIG. 2) that listens to management signals or provided by any other relevant or suitable input. The GNF 254 enables implementation of the correlators 706. The correlators 706 monitor the current state of the managed environment against alarm conditions or incoming notifications to determine when the alarm conditions are true. As these conditions become true, the correlators 706 create new alarms by interacting with the alarm service 704.

The alarm service 704 has two primary functions: to provide an interface which gives access to alarm records in data storage and to generate management signals which communicate alarm state changes to interested applications 105 (FIG. 2). As the correlators 706 detect alarm condition state changes, the correlators 706 invoke the alarm service 704 to create the corresponding alarm or update their state values. Similarly, any application 105 can use the alarm service 704 to retrieve an alarm or make appropriate changes to the alarms. In the preferred embodiment, the data that is available from an alarm record includes: when the alarm became true, when the alarm became false, its state, a reference to the definition of its alarm condition, and a list of the particular event identifications which made the alarm condition true.

As the alarm state changes occur, the alarm service 704 generates management signals 718 for the GNF 254 to notify registered applications 105 of the changes. These alarm states include, for example but not limited to, alarm creation (or validity), alarm acknowledgement, alarm deletion, alarm invalidity (or no longer true), alarm escalation, etc.

The console 708 comprises various tools for alerting the user to alarm state changes and enabling the user to view and manipulate alarms. Examples include an alarm monitor and record browser, an events monitor and browser, a trouble-ticketing system, and an alarm configurator used for defining alarm conditions and registering user interest in particular alarms. Note that an events monitor and browser can be an integral part of the alarm console 708, because it is primarily events which constitute alarm conditions.

An example of an alarm to show operation of the alarm subsystem 702 is as follows. Assume that the memory 124 (FIG. 1) in the form of a hard disk drive is running out of memory storage space. A correlator 706 could be dedicated to monitoring events and determining when the disk memory 124 is approaching full capacity. When the foregoing correlator 706 determines that the disk memory 124 is approaching full capacity, the correlator 706 issues a disk low notification 712 to the alarm service 704, which in turn issues a disk low notification 718 to the GNF 254. The GNF 254 then issues the disk low notification 720 to a registered action server 722, which consumes the notification and executes a script that handles activities to obtain more space in the disk memory 124. There are numerous other examples of alarms, and the aforementioned example should not be limiting.

In concluding the detailed description, it should be noted that it will be obvious to those skilled in the art that many variations and modifications may be made to the preferred embodiments without substantially departing from the principles of the present invention. All such variations and modifications are intended to be included herein within the scope of the present invention, as is set forth in the following claims. Further, in the claims hereafter, the structures, materials, acts, and equivalents of all means-plus-function or step-plus-function elements are intended to include any structures, materials, or acts for performing the specified functions.

Wherefore, the following is claimed:

1. A generic notifications framework system for enhancing operation of a management station on a network by integrating information from different management protocols, comprising:

a translator connected to said network to receive event data elements corresponding with different management protocols from said network, said translator configured to translate said event data elements into respective canonical data structures, said translator configured to selectively extract attribute data from some, but not all of, said event data elements by examination of a native protocol data unit associated with said event data elements, each of said canonical data structures having an attribute data field with said attribute data, if extracted, and a protocol data unit field with said native protocol data unit, said attribute data comprising at least type and length data; and a generic notifications framework connected to said translator to receive said canonical data structure, said framework configured to selectively route said canonical data structures to consumer components by forwarding canonical data structures having predefined attribute fields to corresponding consumer components, said generic notifications framework capable of permitting said consumer components to register to receive said canonical data structures having a particular attribute field.

2. The system of claim 1, further comprising a correlator configured to correlate said canonical data structures to derive an intelligent event.

3. The system of claim 1, wherein said canonical data structure further includes a generic field that designates a protocol corresponding to said event data element.

4. The system of claim 1, further comprising:

a plurality of event subsystems connected to said network, each one of said event subsystems adapted to receive event elements from said network having a particular protocol associated said each one; and a plurality of translators, one of which is said translator, each of which are connected to a respective one of said event subsystems, and all of which are connected to said framework to provide said canonical data structures to said framework.

5. The system of claim 2, further comprising a configurator connected to said framework and configured to specify which of said canonical data structures are to be forwarded to said correlator.

6. The system of claim 4, further comprising a configurator connected to said translators and configured to specify which of said event data elements are to be communicated by each said translator to said generic notification framework.

7. The system of claim 5, wherein said configurator is further connected to said translator and is further configured to specify which of said event data elements are to be communicated by said translator to said generic notification framework.

8. An intelligent integration system for enhancing operation of a management station on a network by correlating and integrating information from different protocols, comprising:

a receiver connected to said network to receive event data elements corresponding to different protocols from said network;

a translator connected to said receiver, said translator configured to extract attribute data from some, but not all of, said event data elements by examination of a native protocol data unit associated with each of said event data elements, said translator configured to translate each of said event data elements into a canonical data structure, said canonical data structure capable of being correlated with other canonical data structures corresponding to other event data elements regardless of protocols associated with said event data elements, said attribute data comprising at least type and length data; and a correlator connected to said translator, said correlator configured to correlate said canonical data structures to derive an intelligent event.

9. A computer readable medium having a computer program for enhancing operation of a management station on a network by integrating information from different protocols, said computer program comprising:

a translator to receive event data elements corresponding with different management protocols from said network, said translator configured to translate said event data elements into respective canonical data structures, said translator configured to selectively extract attribute data from some, but not all of, said event data elements by examination of a native protocol data unit associated with said event data elements, each of said canonical data structures having an attribute data field with said attribute data, if extracted, and a protocol data unit field with said native protocol data unit, said attribute data comprising at least type and length data; and a generic notifications framework to receive said canonical data structure, said framework configured to selectively route said canonical data structures to consumer components by forwarding canonical data structures having predefined attribute fields to corresponding consumer components, said generic notifications framework capable of permitting said consumer components to register to receive said canonical data structures having a particular attribute field.

10. A computer readable medium having a computer program for enhancing operation of a management station on a network by correlating and integrating information from different protocols, said computer program comprising:

a receiver connected to said network to receive event data elements from said network;

a translator connected to said receiver, said translator configured to extract attribute data from some, but not all of, said event data elements by examination of a native protocol data unit associated with each of said event data elements, said translator configured to translate each of said event data elements into a canonical data structure said canonical data structure capable of being correlated with other canonical data structures corresponding to other event data elements regardless of protocols associated with said event data elements, said attribute data comprising at least type and length data; and a correlator connected to said translator, said processor configured to correlate said canonical data structures to derive an intelligent event.

11. A method for enhancing operation of a management station on a network by integrating information from different management protocols, comprising the steps of:

receiving event data elements corresponding with different management protocols from said network;

extracting attribute data from some, but not all of, said event data elements by examination of a native protocol data unit associated with each of said event data elements;

translating said event data elements into respective canonical data structures, each having an attribute data field with said attribute data, if extracted, and a protocol data unit field with said native protocol data unit, said attribute data comprising at least type and length data;

passing said canonical data structures to a framework for possible distribution to consumer components that are connected to said framework;

communicating a particular attribute field from a consumer component to said framework to indicate that said consumer component wishes to receive any of said canonical data structures with said particular attribute field; and forwarding a canonical data structure with said particular attribute field from said framework to said consumer component.

12. A method for enhancing operation of a management station on a network by correlating and integrating information from different protocols, comprising the steps of:

receiving event data elements from said network;

extracting attribute data from some, but not all of, said event data elements by examination of a native protocol data unit associated with each of said event data elements;

translating each of said event data elements into a canonical data structure having an attribute data field with said attribute data, if extracted, and a protocol data unit field with said native protocol data unit, said canonical data structure capable of being correlated with other canonical data structures corresponding to other event data elements regardless of protocols associated with said event data elements, said attribute data comprising at least type and length data; and correlating said canonical data structures to derive an intelligent event.

13. A system for enhancing operation of a management station on a network by integrating information from different management protocols, comprising:
- (1) a translator connected to said network to receive event data elements corresponding with different management protocols from said network, said translator configured to translate said event data elements into respective canonical data structures, said translator configured to selectively extract attribute data from some, but not all of, said event data elements by examination thereof, each of said canonical data structures including:
  - (a) attribute data created by said translator upon examination of data associated with the respective event data element when said extraction is possible, said attribute data comprising at least type and length data; and
  - (b) protocol data that is an encapsulation of native data associated with the respective event data element;
- (2) a generic notifications framework connected to said translator to receive said canonical data structures, said generic notifications framework configured to selectively route said canonical data structures by forwarding canonical data structures having predefined attribute fields to corresponding consumer components; and
- (3) a consumer component capable of communicating with said framework, said consumer component configured to register with said framework to receive any of said canonical data structures having a particular one of said predefined attribute fields.

14. The system of claim 8, further comprising:
a consumer component in communication with said translator configured to register to receive any of said canonical data structures responsive to a particular protocol.

15. The system of claim 14, further comprising:
a plurality of translators, one of which is said translator, each of which are in communication with the network, and all of which are configured to provide said canonical data structures each responsive to a particular protocol.

16. The system of claim 15, further comprising:
a plurality of correlators, one of which is said correlator, each of which are in communication and configured to correlate said canonical data structures to derive an intelligent event responsive to a particular protocol.

17. The system of claim 16, further comprising:
a configurator connected to said translators and configured to specify which of said event data elements are to be communicated by each said translator.

18. A computer configured to implement an intelligent integration system for enhancing operation of a management station on a network by correlating and integrating information from different protocols, comprising:
a receiver capable of communicating with said network to receive event data elements corresponding to different protocols from said network;
a translator capable of communicating with said receiver said translator configured to extract attribute data from some, but not all of, said event data elements by examination of a native protocol data unit associated with each of said event data elements said translator configured to translate each of said event data elements into a canonical data structure, said canonical data structure capable of being, correlated with other canonical data structures corresponding to other event data elements regardless of protocols associated with said event data elements, said attribute data comprising at least type and length data;
a correlator capable of communicating with said translator said correlator configured to correlate said canonical data structures to derive an intelligent event; and
a consumer component capable of communicating with said translator and configured to register to receive any of said canonical data structures responsive to a particular protocol.

19. A computer utilizing a computer readable medium having a computer program for enhancing operation of a management station on a network by integrating, information from different protocols, said computer program comprising:
a translator to receive event data elements corresponding with different management protocols from said network said translator configured to translate said event data elements into respective canonical data structures said translator configured to selectively extract attribute data from some, but not all of said event data elements by examination of a native protocol data unit associated with said event data elements each of said canonical data structures having an attribute data field with said attribute data, if extracted and a protocol data unit field with said native protocol data unit, said attribute data comprising at least type and length data; and
a generic notifications framework to receive said canonical data structure, said framework configured to selectively route said canonical data structures to consumer components by forwarding, canonical data structures having predefined attribute fields to corresponding, consumer components, said generic notifications framework capable of permitting said consumer components to register to receive said canonical data structures having a particular attribute field.

20. The computer readable medium of claim 9, further comprising:
a correlator configured to correlate said canonical data structures to derive an intelligent event.

21. The computer readable medium of claim 9, wherein said canonical data structure further includes a generic field that designates a protocol responsive to said event data element.

22. The computer readable medium of claim 9, further comprising:
a plurality of translators, one of which is said translator, each of which are in communication with the network, and all of which are configured to provide said canonical data structures each responsive to a particular protocol; and
a plurality of event subsystems connected to the network, each one of said event subsystems adapted to receive event elements from the network in response to a particular protocol, and all of which are connected to a respective one of each of said plurality of translators.

23. The computer readable medium of claim 10, wherein said canonical data structure further includes a generic field that designates a protocol responsive to said event data element.

24. The computer readable medium of claim 10, further comprising:
a plurality of translators, one of which is said translator, each of which are in communication with the network, and all of which are configured to provide said canonical data structures each responsive to a particular protocol; and a plurality of correlators, each connected to one of said plurality of translators, each one of said correlators adapted to correlate said canonical data structures, and all of which are further adapted to derive an intelligent event.

25. The method of claim 1, further comprising the step of correlating said canonical data structures to derive an intelligent event.

26. The method of claim 25, further comprising the step of analyzing said canonical data structures to determine which of said canonical data structures are to be correlated.

27. The method of claim 26, further comprising the step of receiving canonical data structures from a plurality of translators associated with a respective plurality of event subsystems connected to said network, each one of said event subsystems adapted to receive event elements from said network having a particular protocol associated said each one.

28. The system of claim 13, further comprising:
a correlator configured to correlate said canonical data structures to derive an intelligent event.

29. The system of claim 28, further comprising:
a configurator connected to said framework and configured to specify which of said canonical data structures are to be forwarded to said correlator.

30. The system of claim 28, further comprising:
a configurator connected to said translator and configured to specify which of said event data elements are to be communicated by said translator to said generic notification framework.

31. A computer utilizing a system for enhancing operation of a management station on a network by integrating information from different management protocols. comprising:

(1) a translator capable of communicating with said network to receive event data elements corresponding with different management protocols from said network said translator configured to translate said event data elements into respective canonical data structures, said translator configured to selectively extract attribute data from some but not all of said event data elements by examination thereof each of said canonical data structures including;
  (a) attribute data created by said translator upon examination of data associated with the respective event data element when said extraction is possible, said attribute data comprising at least type and length data; and
  (b) protocol data that is an encapsulation of native data associated with the respective event data element;
(2) a generic notifications framework capable of communicating with said translator to receive said canonical data structures, said generic notifications framework configured to selectively route said canonical data structures by forwarding, canonical data structures having predefined attribute fields to corresponding consumer components,
(3) a consumer component capable of communicating with said framework, said consumer component configured to resister with said framework to receive any of said canonical data structures having a particular one of said predefined attribute fields; and
(4) a correlator configured to correlate said canonical data structures to derive an intelligent event.

* * * * *

UNITED STATES PATENT AND TRADEMARK OFFICE
CERTIFICATE OF CORRECTION

PATENT NO.   : 6,189,038 B1
DATED        : February 13, 2001
INVENTOR(S)  : Dean R. Thompson et al.

It is certified that error appears in the above-identified patent and that said Letters Patent is hereby corrected as shown below:

Column 1,
Line 63, after "feature." do not begin a new paragraph

Column 5,
Line 49, after "art." begin a new paragraph

Column 6,
Line 50, after "bridge, etc." do not begin a new paragraph

Column 8,
Line 3, after "SNA and NW." do not begin a new paragraph

Column 15,
Line 60, after "receiver" insert -- , --
Line 64, after "elements" insert -- , --
Line 67, after "being" delete ","

Column 16,
Line 5, after "translator" insert -- , --
Line 18, after "work" insert -- , --
Line 19, after "data structures" insert -- , --
Line 21, after "all of" insert -- , --
Line 23, after "data elements" insert -- , --
Line 25, after "extracted" insert -- , --
Line 31, after "forwarding" delete ","

Column 17,
Line 6, delete "claim 1" and insert therefor -- claim 11 --
Line 33, after "protocols" delete "." and insert therefor -- , --

UNITED STATES PATENT AND TRADEMARK OFFICE
CERTIFICATE OF CORRECTION

PATENT NO. : 6,189,038 B1
DATED : February 13, 2001
INVENTOR(S) : Dean R. Thompson et al.

It is certified that error appears in the above-identified patent and that said Letters Patent is hereby corrected as shown below:

Column 18,
Line 4, after "work" insert -- , --
Line 7, delete "some but not all of said" and insert therefor -- some, but not all of, said --
Line 8, after "thereof" insert -- , --

Signed and Sealed this

Third Day of December, 2002

JAMES E. ROGAN
*Director of the United States Patent and Trademark Office*